US009950264B2

United States Patent
Hain et al.

(10) Patent No.: US 9,950,264 B2
(45) Date of Patent: Apr. 24, 2018

(54) SYSTEM AND METHOD FOR PROVIDING ENHANCED WALKTHROUGHS

(71) Applicants: Robert Hain, Limassol (CY); Svetlana Astakhova, Limassol (CY); Maxim Gutchenko, Limassol (CY)

(72) Inventors: Robert Hain, Limassol (CY); Svetlana Astakhova, Limassol (CY); Maxim Gutchenko, Limassol (CY)

( * ) Notice: Subject to any disclaimer, the term of this patent is extended or adjusted under 35 U.S.C. 154(b) by 514 days.

(21) Appl. No.: 14/199,945

(22) Filed: Mar. 6, 2014

(65) Prior Publication Data

US 2015/0231510 A1 Aug. 20, 2015

Related U.S. Application Data

(60) Provisional application No. 61/940,818, filed on Feb. 17, 2014.

(51) Int. Cl.
| | | |
|---|---|---|
| A63F 13/86 | (2014.01) | |
| A63F 13/42 | (2014.01) | |
| A63F 13/22 | (2014.01) | |

(52) U.S. Cl.
CPC ............ *A63F 13/86* (2014.09); *A63F 13/22* (2014.09); *A63F 13/42* (2014.09)

(58) Field of Classification Search
CPC .................................. A63F 13/86; G07F 17/34
See application file for complete search history.

(56) References Cited

U.S. PATENT DOCUMENTS

| | | | |
|---|---|---|---|
| 2008/0119286 A1* | 5/2008 | Brunstetter | A63F 13/00 463/43 |
| 2009/0258708 A1 | 10/2009 | Figueroa | |
| 2010/0069159 A1 | 3/2010 | Yamada | |
| 2011/0021269 A1* | 1/2011 | Wolff-Peterson | A63F 13/10 463/29 |
| 2011/0306395 A1* | 12/2011 | Ivory | A63F 13/49 463/1 |
| 2014/0149496 A1* | 5/2014 | Lee | G09B 5/00 709/203 |
| 2014/0228112 A1* | 8/2014 | Laakkonen | A63F 13/10 463/31 |
| 2015/0343312 A1* | 12/2015 | Navarro | A63F 13/5372 463/31 |

OTHER PUBLICATIONS

Combined Search and Examination Report under Sections 17 & 18(3), dated Aug. 4, 2015, U.K. Intellectual Property Office.
https://web.archive.org/web/20080129081429/http://www.quake3world.com/q3guide/demos.html whole document.

(Continued)

*Primary Examiner* — Robert T Clarke, Jr.
(74) *Attorney, Agent, or Firm* — James M. Smedley LLC; James Michael Smedley, Esq.

(57) ABSTRACT

Embodiments of the present invention are generally directed towards providing walkthroughs. Specifically, embodiments of the present invention are configured to allow for the recording, playback and usage of enhanced walkthroughs, such as for use with video games. Preferred embodiments of the present invention provide multimedia walkthrough content in conjunction with visual representation of control utilization during playback of a video game.

29 Claims, 15 Drawing Sheets

(56) References Cited

OTHER PUBLICATIONS https://web.archive.org/web/20101227183854/http://www.quakelive.com/forum/showthread.php?937-Quake-Live-Recording-Guide-v2 p. 1; power part of section 2.
https://web.archive.org/web/20121028185331/http://www.tilion.org.uk/2011/11/quake-3-demo-format/ p. 2, section 3.
PCT Notification of Transmittal of the International Search Report and The Written Opinion of the International Searching Authority, or the Declaration.

* cited by examiner

SYSTEM AND METHOD FOR PROVIDING ENHANCED WALKTHROUGHS

CROSS REFERENCE TO RELATED APPLICATIONS

This application claims the benefit of U.S. Provisional Patent Application No. 61/940,818, filed Feb. 17, 2014, the entire disclosure of which is incorporated herein by reference.

FIELD OF THE INVENTION

Embodiments of the present invention are generally directed towards providing walkthroughs. Specifically, embodiments of the present invention are configured to allow for the recording, playback and usage of enhanced walkthroughs, such as for use with video games. Preferred embodiments of the present invention provide multimedia walkthrough content in conjunction with visual representation of control utilization during playback of a video game.

BACKGROUND

In general, TV boxes or game consoles provide no default way to record, play or share walkthroughs or gameplays. Therefore there is a Rube Goldberg approach to creating gameplays and walkthroughs by using web cams, external video and audio equipment. The walkthroughs and gameplays are in poor video and audio quality and garners are often in the screen. It can take several hours to set up this approach and the cost includes extra equipment.

Therefore, there is need in the art for systems and methods for providing recording, playback and usage of enhanced walkthroughs, such as for use with video games. These and other features and advantages of the present invention will be explained and will become obvious to one skilled in the art through the summary of the invention that follows.

SUMMARY OF THE INVENTION

Accordingly, it is an aspect of the present invention to provide system and methods for providing, recording, playback and usage of enhanced walkthroughs, such as for use with video games.

According to an embodiment of the present invention, a system for generating enhanced walkthroughs includes: a walkthrough generation module, comprising computer-executable code stored in non-volatile memory, and a processor, one or more input means, wherein at least one of said input means is a controller device, wherein said walkthrough generation module, said processor and said one or more input means are operably connected and are configured to: receive a walkthrough recording request; identify said one or more input means; record input from said one or more input means; detect events from said controller device; record events from said controller device; receive walkthrough termination request; and generate an enhanced walkthrough, wherein said enhanced walkthrough comprises one or more of recorded controller event data, recorded game video data, recorded game audio data, recorded external audio data and recorded external video data.

According to an embodiment of the present invention, the walkthrough generation module, said processor and said one or more input means are further configured to receive content selection information from a user, wherein said content selection indicates what content should be included in said enhanced walkthrough.

According to an embodiment of the present invention, the walkthrough generation module, said processor and said one or more input means are further configured to receive input selection information from a user, wherein said input selection indicates which input means of said one or more input means should be included during recording walkthrough content.

According to an embodiment of the present invention, the walkthrough generation module, said processor and said one or more input means are further configured to receive a rerecord request from a user.

According to an embodiment of the present invention, the rerecord request causes said walkthrough generation module, said processor and at least one of said one or more input means to rerecord a portion of said input data for use in said enhanced walkthrough.

According to an embodiment of the present invention, the walkthrough generation module is further configured to record controller information data.

According to an embodiment of the present invention, the enhanced walkthrough includes said controller information data.

According to an embodiment of the present invention, the events from the controller device are recorded in a manner selected from the group comprising frequency of said events or sequence of said events.

According to an embodiment of the present invention, a method for generating enhanced walkthroughs includes the steps of: receiving a walkthrough recording request; identifying one or more input means associated with a computing device, wherein at least one of said input means is a controller device; recording input from said one or more input means; detecting events from said controller device; recording events from said controller device; receiving walkthrough termination request; and generating an enhanced walkthrough, wherein said enhanced walkthrough comprises one or more of recorded controller event data, recorded game video data, recorded game audio data, recorded external audio data and recorded external video data.

According to an embodiment of the present invention, the method further includes the step of receiving content selection information from a user, wherein said content selection indicates what content should be included in said enhanced walkthrough.

According to an embodiment of the present invention, the method further includes the step of receiving input selection information from a user, wherein said input selection indicates which input means of said one or more input means should be included during recording walkthrough content.

According to an embodiment of the present invention, the method further includes the step of receiving a rerecord request from a user.

According to an embodiment of the present invention, the method further includes the step of rerecording at least one of said one or more input means to rerecord a portion of said input data for use in said enhanced walkthrough.

According to an embodiment of the present invention, the method further includes the step of recording controller information data.

According to an embodiment of the present invention, a computer program product for providing enhanced walkthroughs, comprising: a non-transitory computer readable medium; and computer program code, encoded on the computer readable medium, comprising: a walkthrough generation module configured to: receive a walkthrough recording request; identify one or more input means; record input from said one or more input means; detect events from a controller device; record events from said controller device; receive walkthrough termination request; and generate an enhanced walkthrough, wherein said enhanced walkthrough comprises one or more of recorded controller event data, recorded game video data, recorded game audio data, recorded external audio data and recorded external video data.

According to an embodiment of the present invention, the walkthrough generation module is further configured to receive content selection information from a user, wherein said content selection indicates what content should be included in said enhanced walkthrough.

According to an embodiment of the present invention, the walkthrough generation module is further configured to receive input selection information from a user, wherein said input selection indicates which input means of said one or more input means should be included during recording walkthrough content.

According to an embodiment of the present invention, the walkthrough generation module is further configured to receive a rerecord request from a user.

According to an embodiment of the present invention, the rerecord request causes said walkthrough generation module is further configured to rerecord a portion of said input data for use in said enhanced walkthrough.

According to an embodiment of the present invention, the walkthrough generation module is further configured to record controller information data.

According to an embodiment of the present invention, the enhanced walkthrough includes said controller information data.

DETAILED SPECIFICATION

According to an embodiment of the present invention, the system may be configured to provide software and/or hardware integration into a computing device in order to record video game live play and the ability to replay and share gameplay videos as commented walkthroughs, gameplays, or non-commented walkthroughs for games. In a preferred embodiment, the system is configured to allow for playback of the walkthrough content on a TV or other display screen with Picture-in-Picture technology to be able to play games live while watching walkthrough videos or gameplays simultaneously.

Figure 1:
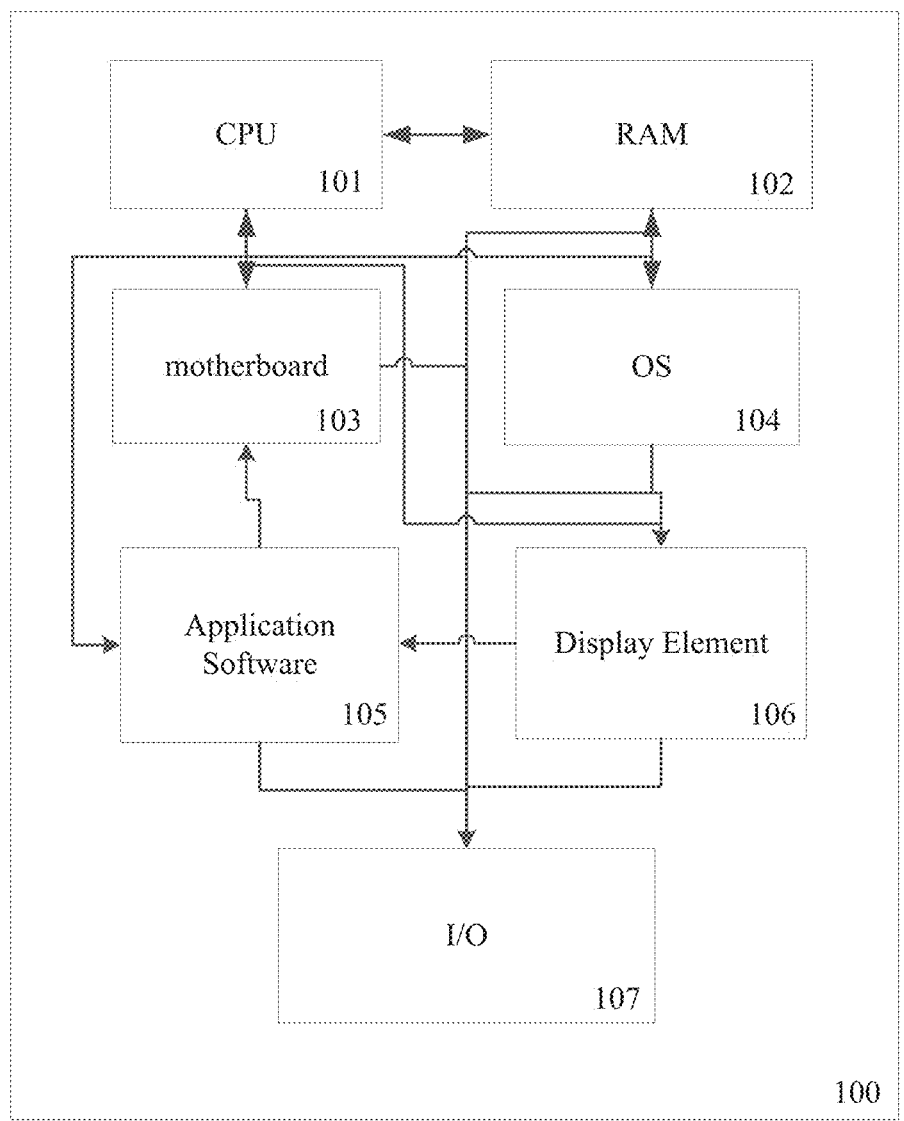
FIG. 1 illustrates a schematic overview of a computing device, in accordance with an embodiment of the present invention.

According to an embodiment of the present invention, the system and method is accomplished through the use of one or more computing devices. As shown in FIG. 1, One of ordinary skill in the art would appreciate that a computing device 100 appropriate for use with embodiments of the present application may generally be comprised of one or more of a Central processing Unit (CPU) 101, Random Access Memory (RAM) 102, a storage medium (e.g., hard disk drive, solid state drive, flash memory, cloud storage) 103, an operating system (OS) 104, one or more application software 105, one or more programming languages 106 and one or more input/output devices/means 107. Examples of computing devices usable with embodiments of the present invention include, but are not limited to, personal computers, smart phones, laptops, mobile computing devices and tablet PCs and servers. The term computing device may also describe two or more computing devices communicatively linked in a manner as to distribute and share one or more resources, such as clustered computing devices and server banks/farms. One of ordinary skill in the art would understand that any number of computing devices could be used, and embodiments of the present invention are contemplated for use with any computing device.

In an exemplary embodiment according to the present invention, data may be provided to the system, stored by the system and provided by the system to users of the system across local area networks (LANs) (e.g., office networks, home networks) or wide area networks (WANs) (e.g., the Internet). In accordance with the previous embodiment, the system may be comprised of numerous servers communicatively connected across one or more LANs and/or WANs. One of ordinary skill in the art would appreciate that there are numerous manners in which the system could be configured and embodiments of the present invention are contemplated for use with any configuration.

In general, the system and methods provided herein may be consumed by a user of a computing device whether connected to a network or not. According to an embodiment of the present invention, some of the applications of the present invention may not be accessible when not connected to a network, however a user may be able to compose data offline that will be consumed by the system when the user is later connected to a network.

Figure 2:
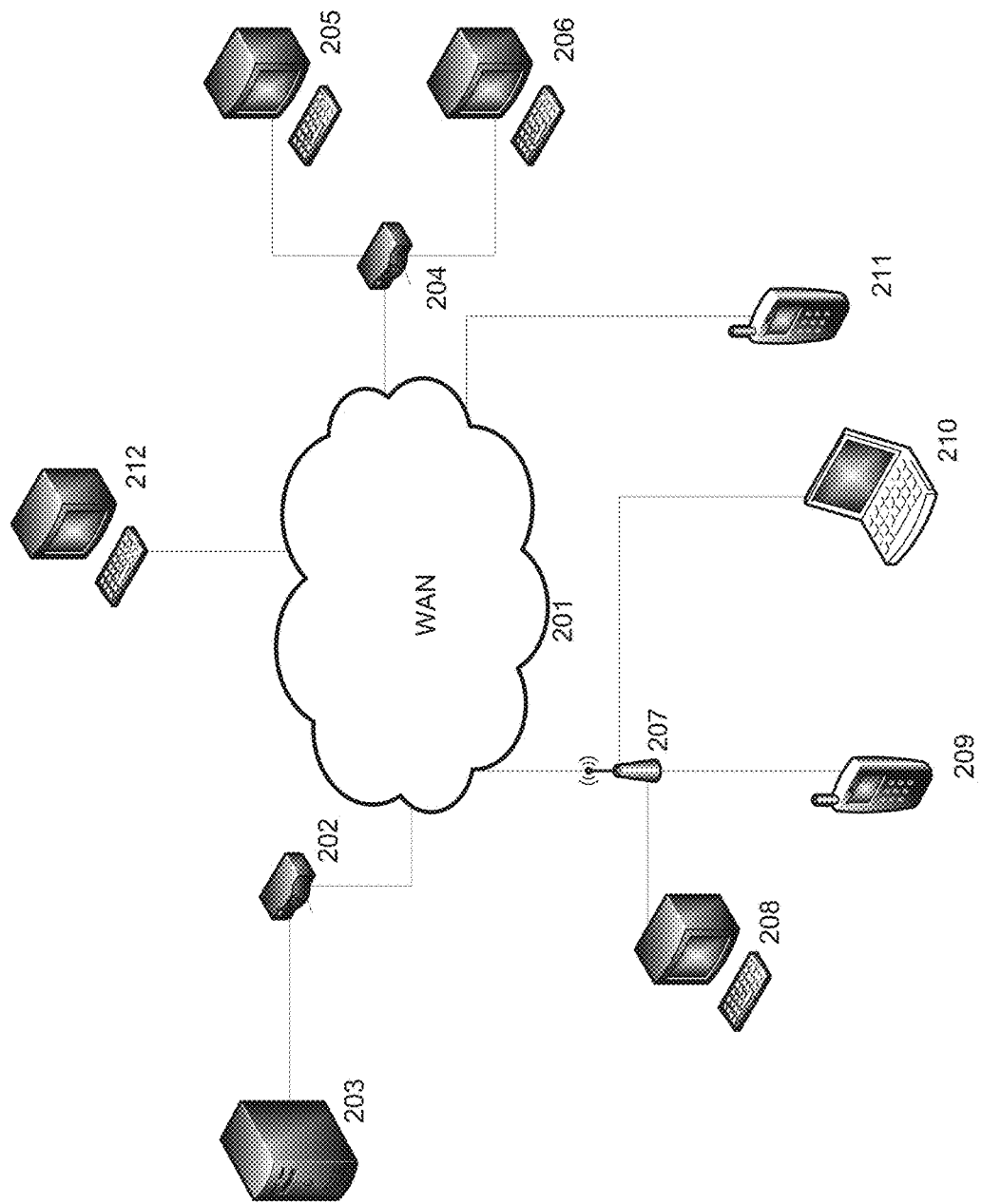
FIG. 2 illustrates a network schematic of a system, in accordance with an embodiment of the present invention.

Referring to FIG. 2, a schematic overview of a system in accordance with an embodiment of the present invention is shown. The system is comprised of one or more application servers 203 for electronically storing information used by the system. Applications in the application server 203 may retrieve and manipulate information in storage devices and exchange information through a Network 201 (e.g., the Internet, a LAN, WiFi, Bluetooth, etc.). Applications in server 203 may also be used to manipulate information stored remotely and process and analyze data stored remotely across a Network 201 (e.g., the Internet, a LAN, WiFi, Bluetooth, etc.).

According to an exemplary embodiment, as shown in FIG. 2, exchange of information through the Network 201 may occur through one or more high speed connections. In some cases, high speed connections may be over-the-air (OTA), passed through networked systems, directly connected to one or more Networks 201 or directed through one or more routers 202. Router(s) 202 are completely optional and other embodiments in accordance with the present invention may or may not utilize one or more routers 202. One of ordinary skill in the art would appreciate that there are numerous ways server 203 may connect to Network 201 for the exchange of information, and embodiments of the present invention are contemplated for use with any method for connecting to networks for the purpose of exchanging information. Further, while this application refers to high speed connections, embodiments of the present invention may be utilized with connections of any speed.

Components of the system may connect to server 203 via Network 201 or other network in numerous ways. For instance, a component may connect to the system i) through a computing device 212 directly connected to the Network 201, ii) through a computing device 205, 206 connected to the WAN 201 through a routing device 204, iii) through a computing device 208, 209, 210 connected to a wireless access point 207 or iv) through a computing device 211 via a wireless connection (e.g., CDMA, GMS, 3G, 4G) to the Network 201. One of ordinary skill in the art would appreciate that there are numerous ways that a component may connect to server 203 via Network 201, and embodiments of the present invention are contemplated for use with any method for connecting to server 203 via Network 201. Furthermore, server 203 could be comprised of a personal computing device, such as a smartphone, acting as a host for other computing devices to connect to.

Figure 3:
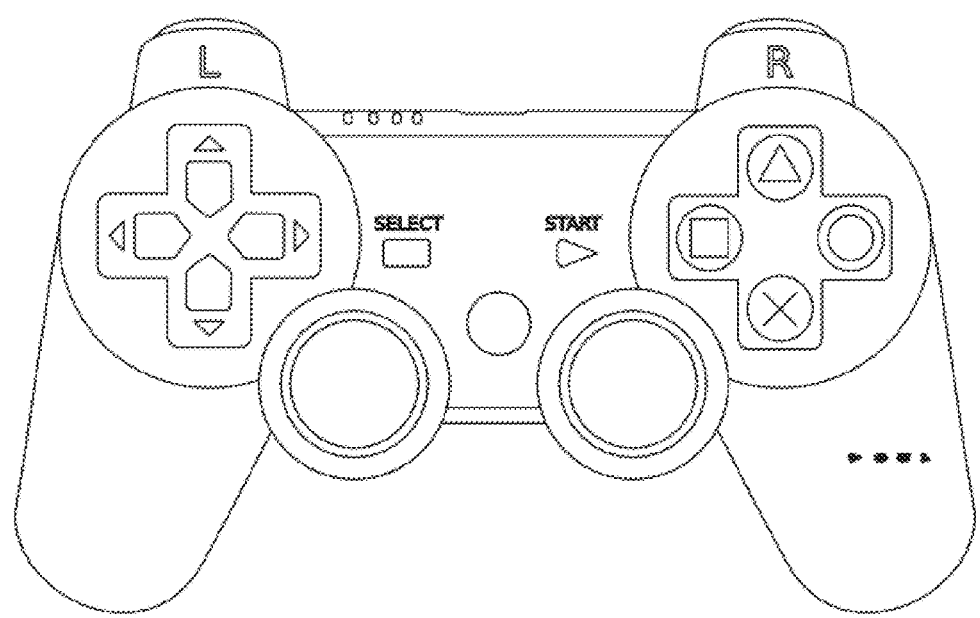
FIG. 3 is a an illustration of a controller that may be presented on screen in conjunction with embodiments of the present invention.

According to an exemplary embodiment, as shown in FIG. 3 shows an example of a controller that could be utilized with embodiments of the present invention. Controllers (or controller devices as they may be referred to) may include, but are not limited to, game console controllers, handheld controllers, motion detection controllers (e.g., Playstation Move, Microsoft Kinect), keyboards, mice, gaming pedals, joysticks, gaming wheels, other gaming input devices, other input devices or any combination thereof. One of ordinary skill in the art would appreciate that there are numerous types of controllers that could be utilized with embodiments of the present invention, and embodiments of the present invention are contemplated for use with any type of controller.

Figure 4A:
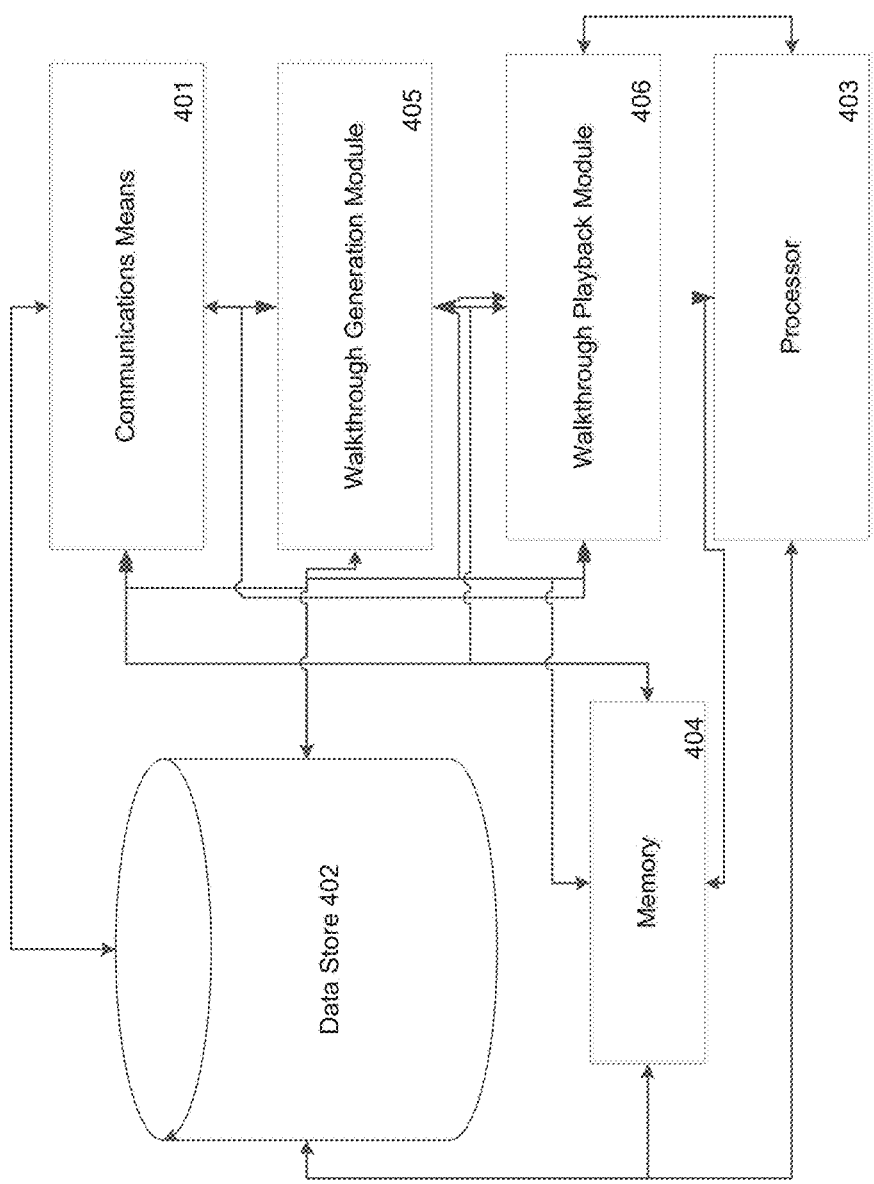
FIG. 4A illustrates a schematic of a system for providing enhanced walkthroughs, in accordance with an embodiment of the present invention.
Figure 4B:
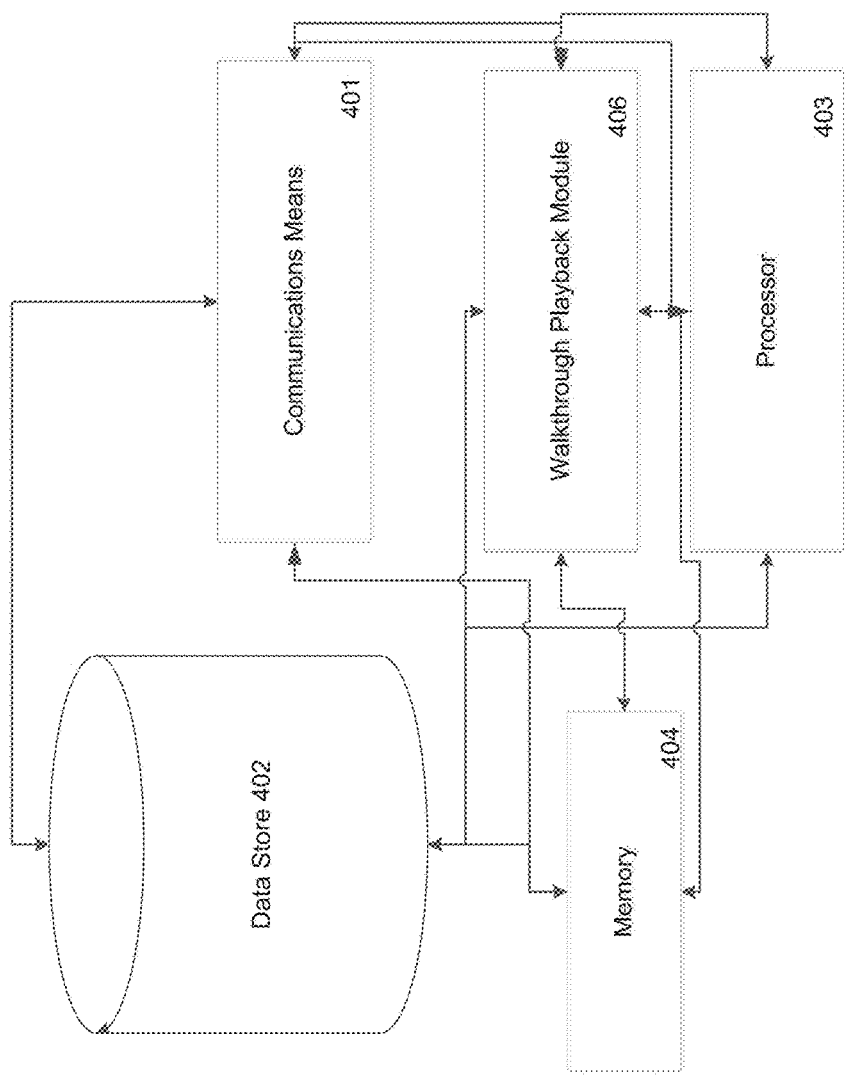
FIG. 4B illustrates a schematic of a system for providing enhanced walkthroughs, in accordance with an embodiment of the present invention.
Figure 4C:
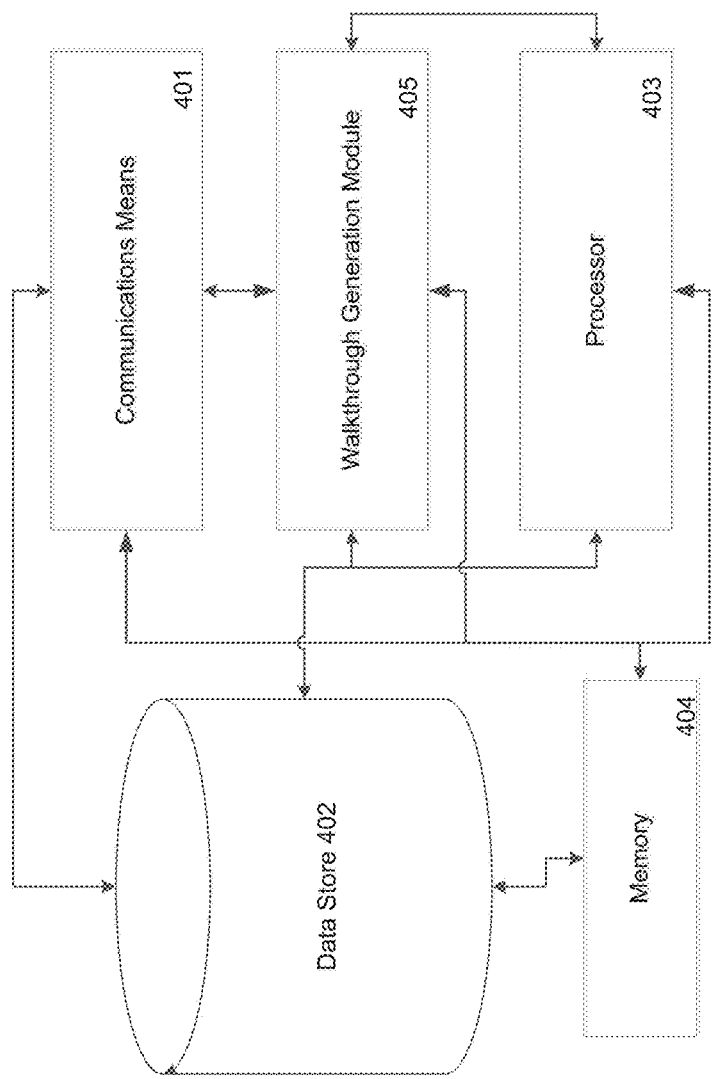
FIG. 4C illustrates a schematic of a system for providing enhanced walkthroughs, in accordance with an embodiment of the present invention.

Turning to FIG. 4A, according to an embodiment of the present invention, a system for providing enhanced walkthroughs is comprised of one or more communications means 401, one or more data stores 402, a processor 403, memory 404, a walkthrough generation module 405 and a walkthrough playback module 406. In FIG. 4B, according to an embodiment of the present invention, a system for providing enhanced walkthroughs is comprised of one or more communications means 401, one or more data stores 402, a processor 403, memory 404 and an walkthrough playback module 406. In FIG. 4C, according to an embodiment of the present invention, a system for providing enhanced walkthroughs is comprised of one or more communications means 401, one or more data stores 402, a processor 403, memory 404 and an walkthrough generation module 405. In alternate embodiments, the system may have additional or fewer components. One of ordinary skill in the art would appreciate that the system may be operable with a number of optional components, and embodiments of the present invention are contemplated for use with any such optional component.

According to an embodiment of the present invention, the communications means of the system may be, for instance, any means for communicating data, voice or video communications over one or more networks or to one or more peripheral devices attached to the system. Appropriate communications means may include, but are not limited to, wireless connections, wired connections, cellular connections, data port connections, Bluetooth connections, fiber optic connections, modems, network interface cards or any combination thereof. One of ordinary skill in the art would appreciate that there are numerous communications means that may be utilized with embodiments of the present invention, and embodiments of the present invention are contemplated for use with any communications means.

According to an embodiment of the present invention, the walkthrough generation module is configured to provide functionality to the system with respect to the detection, recording, processing and generation of data associated with the enhanced walkthroughs described herein. The walkthrough generation module is generally described as a single module throughout this disclosure. However, one of ordinary skill in the art would appreciate that there are numerous implementations, divisions or combinations of the various functional aspects of the walkthrough generation module that could be utilized, such as by separating out the various functional aspects into individual modules or combining both generation and playback modules into a single module, and embodiments of the present invention are contemplated for use with any appropriate modification of the walkthrough generation module.

According to an embodiment of the present invention, the walkthrough playback module is configured to provide functionality to the system with respect to the detection, playback, overlaying of content, processing and other aspects of walkthrough playback associated with the enhanced walkthroughs described herein. The walkthrough playback module is generally described as a single module throughout this disclosure. However, one of ordinary skill in the art would appreciate that there are numerous implementations, divisions or combinations of the various functional aspects of the walkthrough playback module that could be utilized, such as by separating out the various functional aspects into individual modules or combining both generation and playback modules into a single module, and embodiments of the present invention are contemplated for use with any appropriate modification of the walkthrough playback module.

According to an embodiment of the present invention, the system provides a solution to record and share walkthroughs and gameplays of video games automatically through a game console without the need for special devices, equipment or the expenditure of additional money and time.

According to an embodiment of the present invention, the walkthrough generated by the system may be shared, via the system or associated computing device via one or more communication means and made available via a remote link (e.g., URL, application marketplace or store). In a preferred embodiment, a portion of the system or a remote system may be utilized to generate a market place for video gameplay and walkthroughs due to the professional level of the multimedia content recordings.

According to an embodiment of the present invention, the system provides the ability to record, play and share walkthrough, including, but not limited to: (i) playback of walkthrough in mode Picture-in-Picture, which gives garners the ability to play games and see walkthrough on the same screen simultaneously, which makes it far easier to make walkthroughs and gameplays and to view them and use them in an advantageous way; (ii) ability to fast start recording video by special key combination on the game controller; (iii) ability to add voice comments on the walkthrough using a microphone; (iv) ability to share this walkthrough using own service or to share it using most common services for sharing video and walkthroughs.

According to an embodiment of the present invention, a main advantage of embodiments of the system is that the system provides the ability to record walkthroughs without regard to the underlying game or content being recorded. As an external component to a game itself, the system is capable of recording not only the actual content of the game (e.g., video, audio), but also other relevant information (e.g., controller button events, game events, game specific information—such as player orientation, player location, time, date, game time, character equipment). These relevant information times may be required and useful for particular types of walkthroughs, such as fighting games that may require the player to be at a specific distance from an opponent or have a specific orientation in order to complete a move (e.g., finishing move). Other uses for relevant information comprising location information include for use in locating a starting point of a walkthrough in a game with an open 3D world where the walkthrough is intended for use in a specific location in that 3D world. One of ordinary skill in the art would appreciate that there are numerous types of relevant information that could be recorded by the system, and embodiments of the present invention are contemplated for use with any such information.

According to an embodiment of the present invention, the system may further be configured to allow a user to watch the walkthrough as it is recorded while they play the live game. This feature allows users to simultaneously watch gameplay and walkthroughs while they play live games. This provides users with the ability to improve their games immeasurably.

According to an embodiment of the present invention, the system may further be configured to record external content for use in the walkthrough as well as game content. For instance, the system may be configured to record video from a webcam connected to the system, whether locally connected or remotely connected (e.g., via a network connection) to be able to make fun walkthroughs with live comments of garners and show their emotions while playing a live game. Other external content types include, but are not limited to, external audio (e.g., voice instructions, music), external video, external game information (e.g., raid tracking information), or any combination thereof. One of ordinary skill in the art would appreciate that there are numerous types of external content that could be utilized with embodiments of the present invention, and embodiments of the present invention are contemplated for use with any type of external content.

According to an embodiment of the present invention, the system may be configured to show pressed keys or other controller or game event actions on the walkthrough video, such as via an extra layer added on video. In this manner, the enhanced walkthroughs not only show users how to perform some task or feat, but show the users what buttons, keys or other actions need to be taken to effect the task or feat. In this manner, the system and the related walkthroughs make it easy to follow and understand precisely how gameplay and walkthroughs were played by the original user recording the walkthrough. When used in conjunction with a video game, this allows the user to mimic the button play of the gamer that created the walkthrough so that he can improve his game, win more games, learn how the reach higher levels and potentially monetize his game play by improving and winning at tournaments.

According to an embodiment of the present invention, the system may be configured to show keys pressed or other controller/event actions right on walkthrough video. In a preferred embodiment, this may be achieved by automatically adding an extra layer on the walkthrough video with a virtual image game controller and demonstrating when the button is pressed at the precise moment of play (See, FIG. 3). By providing an animated image of the controller or other input device (e.g., keyboard, mouse), the garner can see in two dimensions the button play in a simple way and clear way.

According to an embodiment of the present invention, the system may be configured to automatic detect the type of controller being used during recording of the walkthrough and record various button presses or other controller events. The system can record these events in such a manner that each button press can be associated with an action type or specific button such that it may allow for translation to other controllers or game platforms. For instance, if a gamer watching a walkthrough is using a different controller type or platform, the system can convert the walkthrough controller actions to the correct game controller type (e.g., brand, model, system) to show corresponding button gameplay for the user so he will easy understand which exact key to press. By automatically detecting the controller type on the console as well as the brand, the corresponding button gameplay will provide the learning gamer the correct button play as if the walkthrough were played on the learning gamer's controller.

According to an embodiment of the present invention, controller event data can be recorded in a manner either specified by the system or specified by the user of the system. Controller event data may include, but is not limited to, button press, button release, button hold, analog stick movement, motion sensor movement (e.g., accelerometer data, 3D video data), mouse movement, key press, key release, key hold, trigger press, trigger release, trigger hold or any combination thereof. One of ordinary skill in the art would appreciate that there are numerous types of controller event data that could be recorded by the system and embodiments of the present invention are contemplated for use with any type of controller event data.

According to an embodiment of the present invention, Controller event data may be recorded in a variety of manners, including, but not limited to, synchronized with recording time, recorded in sequence without relation to time, controller event pacing (i.e., event frequency) (e.g., rate of button presses over time—2 event/sec, 1 event/sec, 1 event/5 secs), or any plausible combination thereof. The recording type for controller events may be based, at least in part, on the type of game or content associated with the walkthrough being recorded. For instance, a walkthrough for a finishing move on a fighting game may require buttons to be pressed in a specific sequence in a certain amount of time (and further require location information, such as distance from opponent which may also be recorded as noted elsewhere herein), while a puzzle game may not require frequency or timing information, but rather simply the button combination (e.g., specific events in series representing a code for a puzzle). One of ordinary skill in the art would appreciate that there are numerous methods in which controller event data may be recorded, and embodiments of the present invention are contemplated for use with any such controller event recording method/type.

According to an embodiment of the present invention, this feature of the system allows users to simultaneously watch gameplay and walkthroughs while they play live games and to actually see how the gamer who provided the walkthrough clicked specific buttons. This provides users with the ability to improve their games immeasurably.

According to an embodiment of the present invention, the system may be configured to provide, or work in conjunction with, a software app controller, external physical controllers and/or game controller utilizing this invention in order to: (i) show the movement of objects and their rotation or 3D position in space in order to show 3D movements that the gamer did to create a movement in space; (ii) show a model of a human (or similar character type) and how the user recording the walkthrough moved in 3D space. Such 3D movements may be recorded by way of a camera (e.g., webcam), external controller (e.g., Xbox Kinect®, Playstation Move®), mobile computing device with a software application controller or similar interface (e.g., smartphone with accelerometer) or any other computing device capable of interacting with the system and recording movements of a user.

According to an embodiment of the present invention, a method for recording and/or providing an enhanced walkthrough comprises the steps of: (i) initiating a walkthrough recording (preferably directly on the gaming system on which a game is being played); (ii) receiving one or more data types from the group comprising, controller data, controller event data, controller motion data, game video data, game audio data, external audio data, external video data, external motion data, external ancillary data, game ancillary data and time/date information; (iii) generating an enhanced walkthrough recording from said one or more data types; (iv) formatting said enhanced walkthrough for playback on a gaming system; and (v) storing said enhanced walkthrough. One of ordinary skill in the art would appreciate that the method could include fewer or additional steps, depending on the embodiment of the invention to be utilized.

According to an embodiment of the present invention, a method for playback of an enhanced walkthrough comprises the steps of: (i) receiving a request to playback an enhanced walkthrough; (ii) determining controller information of a user; and (iii) overlaying game content with one or more enhanced walkthrough content (e.g., video, audio, controller event data). Alternative embodiments may also include steps, such as, but not limited to: (i) synchronizing enhanced walkthrough playback with game content based on one or more game data elements (e.g., player location, zone, quest start, character text, non-player character text, audio signal, video signal, image analysis (e.g., compare game content display to recorded image/video content of the enhanced walkthrough)); (ii) time-altering enhanced walkthrough content (e.g., slow motion, fast forward, rewind, pause); (iii) ghosting enhanced walkthrough content over game content; or (iv) any combination thereof). One of ordinary skill in the art would appreciate that the method could include fewer or additional steps, depending on the embodiment of the invention to be utilized.

According to an embodiment of the present invention, the system may provide the ability for walkthroughs to be recorded and playback provided concurrently or simultaneously. In this manner, the system can allow for live recording/playback of a walkthrough. This allows broadcasts of live gaming walkthroughs or live gaming events. For instance, a live gaming walkthrough may be utilized by a professional gamer, where that gamer's gameplay is broadcast or displayed for viewers or spectators to see what the gamer is doing and how he/she is doing it in real-time or near-real-time.

EXEMPLARY EMBODIMENTS

Figure 5:
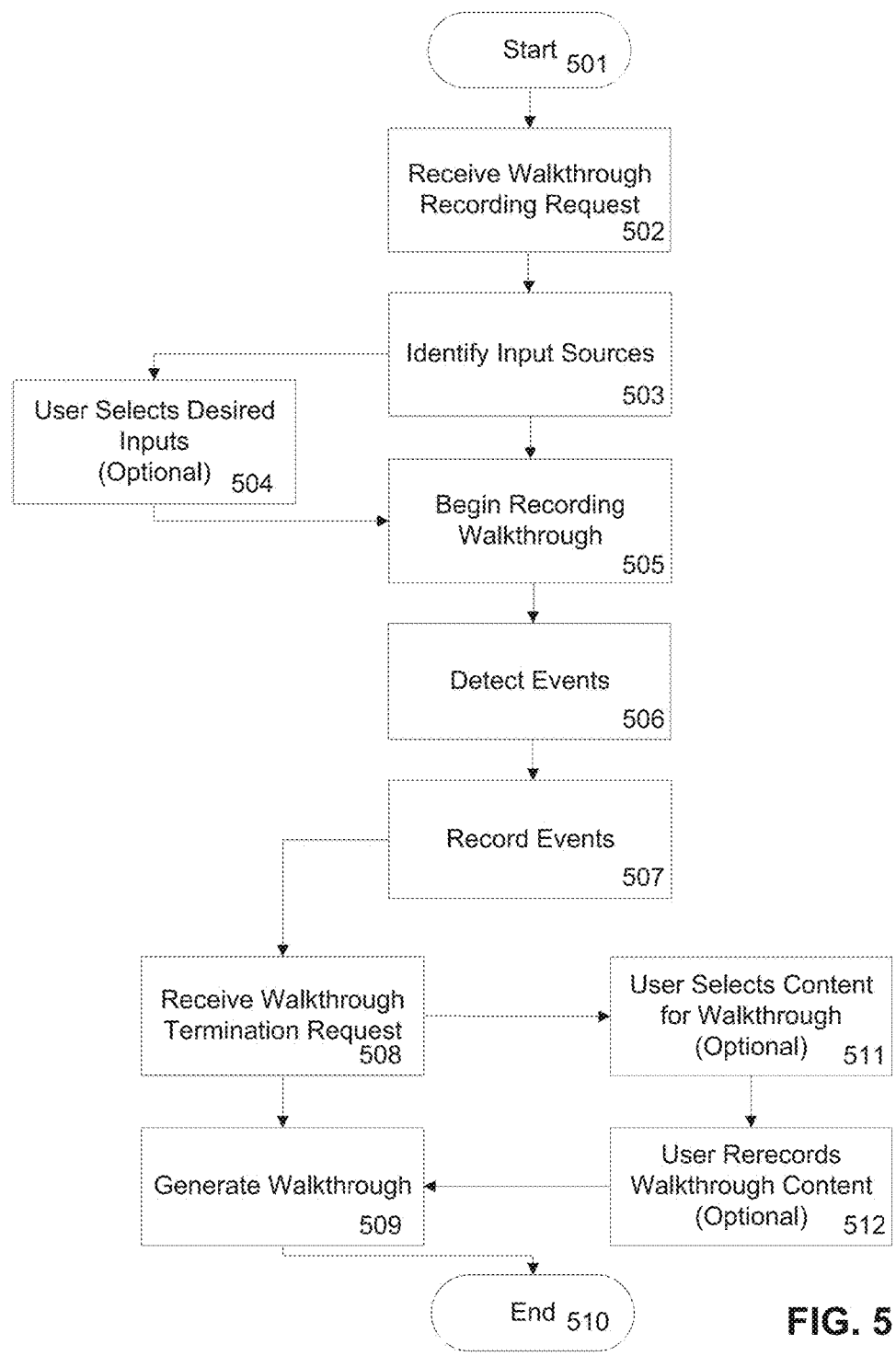
FIG. 5 is a process flow of an exemplary method in accordance with embodiments of the present invention.

Turning now to FIG. 5, an exemplary method for providing enhanced walkthrough generation is shown. The process starts at step 501 with a user requesting to start recording an enhanced walkthrough through utilization of the present systems and methods. At step 502, the system receives the walkthrough recording request from the user and begins to process the required information needed to transact the recording.

At step 503, the system determines what input devices are available for recording of data to be included in the enhanced walkthrough. This may include, but is not limited to, input means, controller devices, video sources, audio sources, external content sources (e.g., webcam, microphone), or any combination thereof. Once the system has identified the input devices that may be used to record input data, the system may determine which input devices to record data from. This may be done, for instance, via a settings panel or other default or customized setting associated with walkthrough generation module. Optionally, at Step 504, the system may allow the user to select which input devices the system should record data from. This allows the user to deselect or otherwise prevent recording input data from an input device they do not want included in the enhanced walkthrough (e.g., no webcam data).

At step 505, the system begins recording the walkthrough data. In preferred embodiments, this will include game video data and controller data (including controller device input and controller device type/identification information). In other embodiments, the included data may be any of the data types mentioned throughout this disclosure.

At step 506, the system continues to detect (and in conjunction with Step 507—record) the user's interaction with a game or other content in order to detect events (e.g., controller events), generally recorded along a timeline and associated with the time the user actually engages an event on the controller device or other input device. In this manner, when the playback is generated and replayed, the enhanced walkthrough will be able to present to the playback user data associated with the controller devices and other input devices in synchronization with their own game play or other content play. Other embodiments may incorporate non-temporal event recording types, such as recording sequences where timing is of little importance (e.g., the order of the controller events matter, but not the timing of the controller events).

At step 508, the system receives a walkthrough termination request from the user (generally via a controller device or other input means). The system then ends recording of the content for the enhanced walkthrough. At this point, the system has all input data required for the enhanced walkthrough. The system may then generate the enhanced walkthrough (Step 509) and store the walkthrough accordingly (e.g., associating various data types and elements in a relational manner—such as via JSON or XML objects). At this point, the process terminates at Step 510.

Alternatively and optionally, the system may, at Step 511, allow the user the ability to select which types of content recorded by the system will be used in the enhanced walkthrough. This may allow the user to eliminate data types that may not be useful or otherwise unnecessarily complicate the walkthrough (e.g., user webcam data not relevant to game play). Further, at Step 512, the system may permit the user the ability to rerecord or otherwise alter walkthrough data that was recorded. For instance, if the external audio recorded via the user was garbled or otherwise not suitable for the enhanced walkthrough, the system could allow the user to just rerecord those parts of the walkthrough data (e.g., playback walkthrough content while rerecording content selected by user). After these optional steps are completed, the system would generate the walkthrough (Step 509) and the process would terminate (Step 510).

Figure 6:
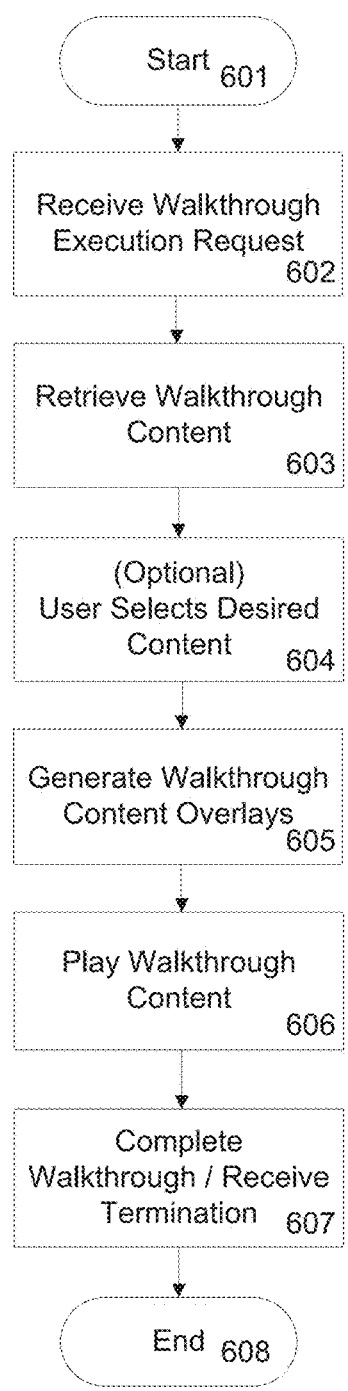
FIG. 6 is a process flow of an exemplary method in accordance with embodiments of the present invention.

Turning now to FIG. 6, an exemplary method for providing enhanced walkthrough playback is shown. The process starts at FIG. 601 with a user requesting to start playback of an enhanced walkthrough through utilization of the present systems and methods. At step 602, the system retrieves the walkthrough content (generally from a storage medium or other storage device or communications means for remotely provided walkthrough content).

Optionally, at step 604, the system may provide the user with the types of content contained in the walkthrough (e.g., controller event data, game video, game audio, external audio, external video) and allow the user to select which of the content types the user wishes to be presented with during the walkthrough.

At step 605, the system generates and places overlays on the display element of the user which is attached to the computing device the system utilizes in order to provide areas for display content when playback of the walkthrough begins. The system may be configured to provide one or more overlays, depending on playback content type (e.g., overlay for controller event playback, overlay for video playback content, overlay for webcam content). In certain embodiments, the system may optimize the overlays based on the game or other content the walkthrough is to be played back with. For instance, if the system knows what game is associated with the walkthrough content, it can place the overlays in a manner such that the game content is not interfered with during playback.

At step 606, the system begins playback of the walkthrough content as prepared and designed by the system. At some later point, the walkthrough content playback will terminate, generally due to the completion of the playback or receipt of a request from a user to terminate the playback. At this point, the process terminates at step 608.

Figure 7:
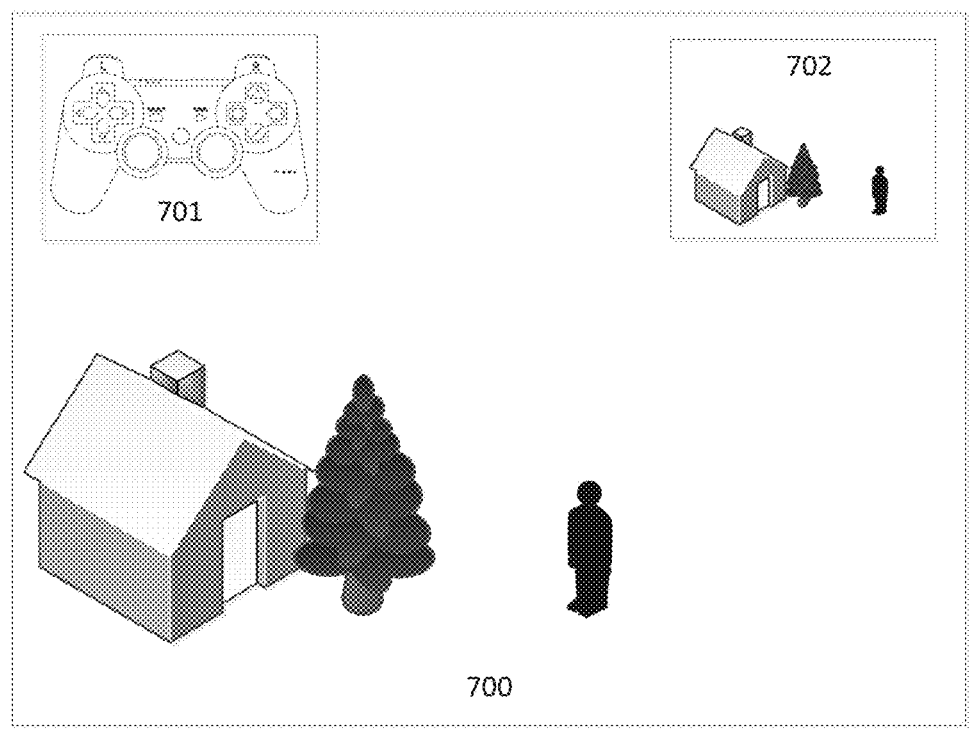
FIG. 7 illustrates an exemplary depiction of an overlay model in accordance with embodiments of the present invention.

Turing now to FIG. 7, an illustration of an exemplary playback of walkthrough content is shown. Game content 700 is shown overlaid with content overlays 701, 702 provided by the system. Controller content overlay 701 represents the controller utilized by the user playing the current game. Controller events recorded by the recording user who recorded the walkthrough content may be converted to the controller type of the controller type used by the playback user. Game video overlay 702 shows the video content recorded by the recording user during the recording of the walkthrough content. The playback user can use the overlays to help them achieve the walkthrough goals recorded in the enhanced walkthrough.

Figure 8A:
FIG. 8A is a an illustration of an exemplary embodiment of a controller that may be utilized in conjunction with the system in order to record controller events, in accordance with embodiments of the present invention.
Figure 8B:
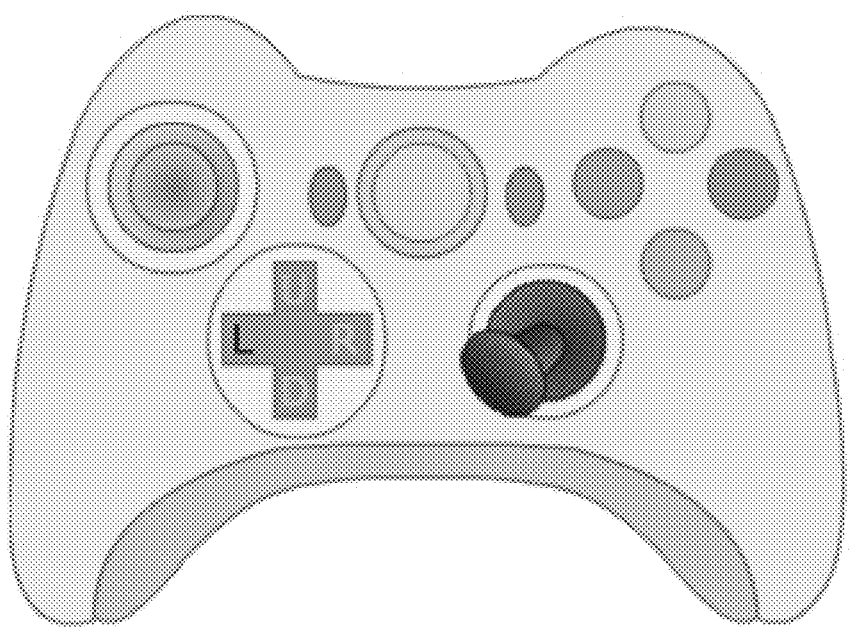
FIG. 8B is a an illustration of an exemplary embodiment of a controller that may be utilized in conjunction with the system in order to record controller events, in accordance with embodiments of the present invention.
Figure 8C:
FIG. 8C is a an illustration of an exemplary embodiment of a controller that may be utilized in conjunction with the system in order to record controller events, in accordance with embodiments of the present invention.
Figure 8D:
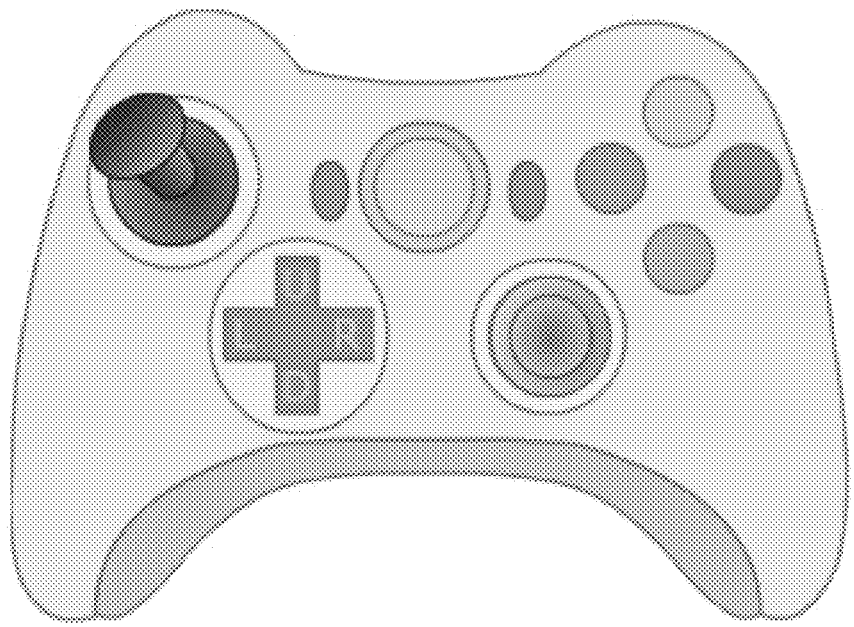
FIG. 8D is a an illustration of an exemplary embodiment of a controller that may be utilized in conjunction with the system in order to record controller events, in accordance with embodiments of the present invention.
Figure 8E:
FIG. 8E is a an illustration of an exemplary embodiment of a controller that may be utilized in conjunction with the system in order to record controller events, in accordance with embodiments of the present invention.
Figure 8F:
FIG. 8F is a an illustration of an exemplary embodiment of a controller that may be utilized in conjunction with the system in order to record controller events, in accordance with embodiments of the present invention.
Figure 8G:
FIG. 8G is a an illustration of an exemplary embodiment of a controller that may be utilized in conjunction with the system in order to record controller events, in accordance with embodiments of the present invention.
Figure 8H:
FIG. 8H is an illustration of an exemplary embodiment of a controller that may be utilized in conjunction with the system in order to record controller events, in accordance with embodiments of the present invention.
Figure 8I:
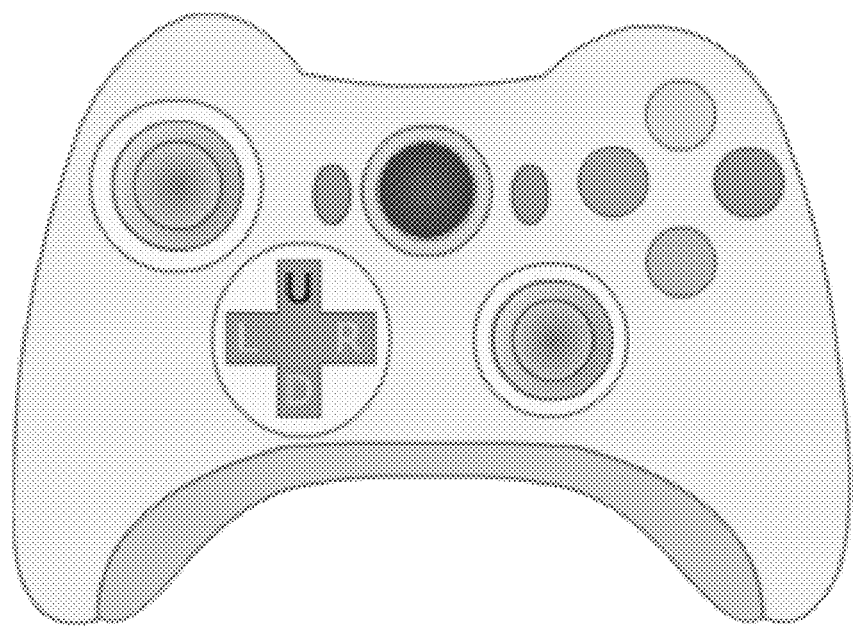
FIG. 8I is an illustration of an exemplary embodiment of a controller that may be utilized in conjunction with the system in order to record controller events, in accordance with embodiments of the present invention.
Figure 8J:
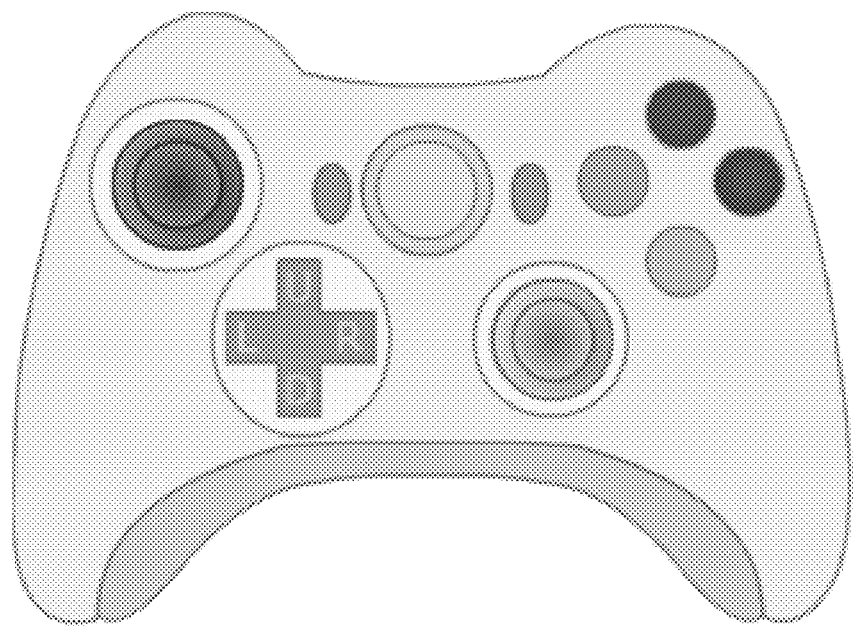
FIG. 8J is an illustration of an exemplary embodiment of a controller that may be utilized in conjunction with the system in order to record controller events, in accordance with embodiments of the present invention.

Turning now to FIG. 8A-8J, illustrations of an exemplary embodiment of a controller that may be utilized in conjunction with the system in order to record controller events. These figures show a sampling of various positions controller elements could be put in to create controller events detectable and recordable by the system. Each of the figures shows a controller comprising a left analog stick, a directional pad, a plurality of system buttons located in the top center of the controller, a right analog stick and an arrangement of buttons in a diamond shape comprising a top button, right button, left button and a bottom button. FIG. 8A shows the left analog stick in an upper left position and the right button pressed. FIG. 8B shows the right analog stick in a lower left position and the left directional pad pressed. FIG. 8C shows the bottom button pressed. FIG. 8D shows the left analog stick in an upper left position. FIG. 8E shows the left analog stick in a lower right position and the right analog stick in an upper right position. FIG. 8F shows the left analog stick in an upper left position and both the left and lower buttons pressed. FIG. 8G shows the left analog stick in an upper right position and the top button pressed. FIG. 8H shows the up directional pad element pressed as well as a center system button pressed. FIG. 8I shows the up directional pad element pressed as well as a center system button pressed. FIG. 8J shows the top and right buttons pressed.

With respect to FIG. 8A-8J, the controller events identified could be recorded in any of the manners described herein. For instance, if sequential recording is desired (i.e., not specifically attached to time, but rather the sequence being the important factor), the controller events may be recorded as: Sequence 1—left analog stick in an upper left position and the right button; Sequence 2—right analog stick in a lower left position and left directional pad; Sequence 3—bottom button; Sequence 4—left analog stick in an upper left position; Sequence 5—left analog stick in a lower right position and right analog stick in an upper right position;

Sequence 6—left analog stick in an upper left position, left and lower button; Sequence 7—left analog stick in an upper right position and top button; Sequence 8—up directional pad element pressed and center system button; Sequence 9—up directional pad element and center system button; Sequence 10—top and right buttons. When displayed in an overlay, the system may be configured to detect the user input during playback so that the sequence does not move to the next step until the user completes the current step. In this manner, the walkthrough assists the user by ensuring the user completes a sequence step successfully before moving on.

Figure 9:
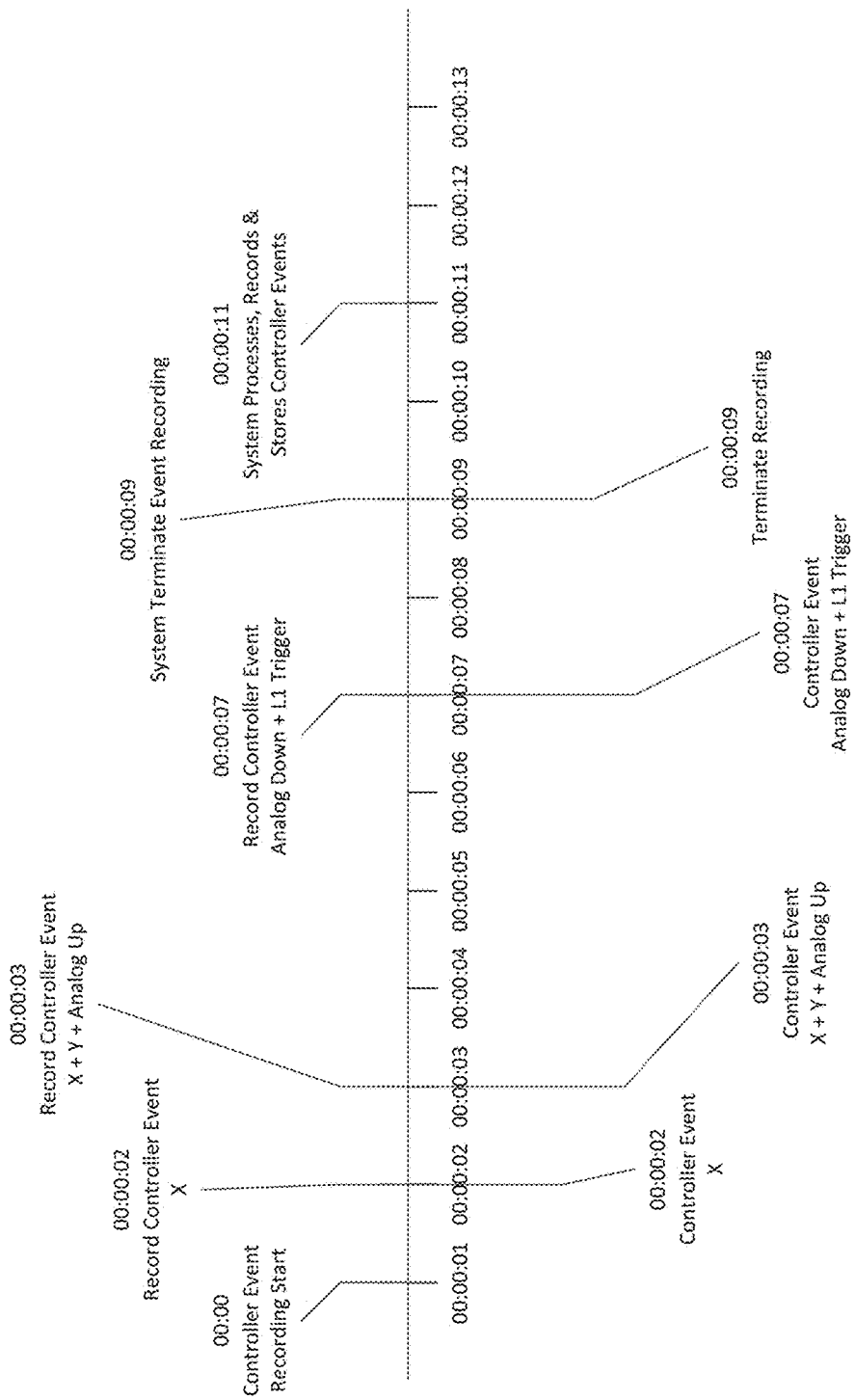
FIG. 9 is an illustration of a timeline showing controller events occurring and being recorded by the system, in accordance with embodiments of the present invention.

Turning now to FIG. 9, an illustration of a timeline showing controller events occurring and being recorded by the system is shown. Events occurring below the timeline show controller events input through use of a controller attached to the system and utilized by a user recording a walkthrough. Events occurring above the timeline show the systems response to events occurring below the timeline. While events above and below the timeline may be shown occurring at the same time, one or ordinary skill in the art would appreciate that the timing may be off slightly as there may be a difference between a controller event occurring and that controller event being recorded by the system, whether due to inherent latencies of the system or other offsets. In certain embodiments of the present invention, these offsets may be determined by the system and the controller events recorded adjusted according to the determined amount of offset.

In FIG. 9, the timeline starts with the beginning of a walkthrough recording. At time 00:00:01, the system starts detecting and recording events. At time 00:00:02, the user presses an "X" button on a controller and the event is concurrently recorded by the system. At time 00:00:03, the user presses an "X" button, "Y" button and pushed up on an analog stick on the controller and the events are concurrently recorded by the system. At time 00:00:07, the user presses an analog stick down and pushes trigger "L1" on the controller and the events concurrently recorded by the system. At time 00:00:09, the user selects to terminate event recording and the system stops recording additional events from the controller. At time 00:00:11, the system processes all events recorded and associates each event with the time they occurred at, allowing for playback based on timed sequences of button presses.

Throughout this disclosure and elsewhere, block diagrams and flowchart illustrations depict methods, apparatuses (i.e., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on—any and all of which may be generally referred to herein as a "circuit," "module," or "system."

While the foregoing drawings and description set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

Traditionally, a computer program consists of a finite sequence of computational instructions or program instructions. It will be appreciated that a programmable apparatus (i.e., computing device) can receive such a computer program and, by processing the computational instructions thereof, produce a further technical effect.

A programmable apparatus includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computer can include any and all suitable combinations of at least one general purpose computer, special-purpose computer, programmable data processing apparatus, processor, processor architecture, and so on.

It will be understood that a computer can include a computer-readable storage medium and that this medium may be internal or external, removable and replaceable, or fixed. It will also be understood that a computer can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the invention as claimed herein could include an optical computer, quantum computer, analog computer, or the like.

Regardless of the type of computer program or computer involved, a computer program can be loaded onto a computer to produce a particular machine that can perform any and all of the depicted functions. This particular machine provides a means for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

According to an embodiment of the present invention, a data store may be comprised of one or more of a database, file storage system, relational data storage system or any other data system or structure configured to store data, preferably in a relational manner. In a preferred embodiment of the present invention, the data store may be a relational database, working in conjunction with a relational database management system (RDBMS) for receiving, processing and storing data. In the preferred embodiment, the data store may comprise one or more databases for storing information related to the processing of moving information and estimate information as well one or more databases configured for storage and retrieval of moving information and estimate information.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these. All such implementations are within the scope of the present disclosure.

In view of the foregoing, it will now be appreciated that elements of the block diagrams and flowchart illustrations support combinations of means for performing the specified functions, combinations of steps for performing the specified functions, program instruction means for performing the specified functions, and so on.

It will be appreciated that computer program instructions may include computer executable code. A variety of languages for expressing computer program instructions are possible, including without limitation C, C++, Java, JavaScript, assembly language, Lisp, HTML, and so on. Such languages may include assembly languages, hardware description languages, database programming languages, functional programming languages, imperative programming languages, and so on. In some embodiments, computer program instructions can be stored, compiled, or interpreted to run on a computer, a programmable data processing apparatus, a heterogeneous combination of processors or processor architectures, and so on. Without limitation, embodiments of the system as described herein can take the form of web-based computer software, which includes client/server software, software-as-a-service, peer-to-peer software, or the like.

In some embodiments, a computer enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computer can process these threads based on priority or any other order based on instructions provided in the program code.

Unless explicitly stated or otherwise clear from the context, the verbs "execute" and "process" are used interchangeably to indicate execute, process, interpret, compile, assemble, link, load, any and all combinations of the foregoing, or the like. Therefore, embodiments that execute or process computer program instructions, computer-executable code, or the like can suitably act upon the instructions or code in any and all of the ways just described.

The functions and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, embodiments of the invention are not described with reference to any particular programming language. It is appreciated that a variety of programming languages may be used to implement the present teachings as described herein, and any references to specific languages are provided for disclosure of enablement and best mode of embodiments of the invention. Embodiments of the invention are well suited to a wide variety of computer network systems over numerous topologies. Within this field, the configuration and management of large networks include storage devices and computers that are communicatively coupled to dissimilar computers and storage devices over a network, such as the Internet.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

The invention claimed is:

1. A system comprising:
   a display device;
   one or more first type controller associated with identification information corresponding to the first type and optionally associated with a first game platform, the first type controller being selected from the group consisting of a first type game console controller, a first type remote motion detection controller, a first type keyboard, a first type mouse, a first type gaming pedal, and a first type gaming wheel;

one or more second type controller associated with identification information corresponding to the second type being different from the first type, and optionally associated with a second game platform, the second game platform optionally being different from the first game platform, the second controller selected from the group consisting of a second type game console controller, a second type remote motion detection controller, a second type keyboard, a second type mouse, a second type gaming pedal, and a second type gaming wheel;

a processor; and a memory device storing instructions, which when executed by the processor, cause the processor to operate in conjunction with the one or more first and one or more second type controllers and the display device to:

(a) automatically generate an enhanced walkthrough by:
   (i) determining that the one or more first type controller is capable of being used to record input from the one or more first type controller based on the identification information;
   (ii) receiving a walkthrough recording request from the one or more first type controller;
   (iii) receiving input selection information from the one or more first type controller;
   (iv) selecting, based on the input selection information, the one or more first type controller to be included during a recording of walkthrough content;
   (v) automatically recording the input from the one or more first type controller;
   (vi) automatically detecting events from the one or more first type controller;
   (vii) providing recorded controller event data by automatically recording the events from the one or more first type controller;
   (viii) recording at least one of game video data, player orientation data, player location data, game audio data, external audio data and external video data; and
   (ix) upon receiving a walkthrough termination request from the one or more first type controller, generating the enhanced walkthrough comprising the recorded controller event data and at least one of the recorded game video data, the recorded player orientation data, the recorded player location data, the recorded game audio data, the recorded external audio data and the recorded external video data;

(b) automatically detect that the one or more first type controller that was used during the recording of the events is of the first type;

(c) associate the recorded events with an action type or specific button to allow translation to the one or more second type controller and optionally to the second game platform; and (d) for a user using one or more controller of the second type:
   (i) display, via the display device, game content;
   (ii) enable the user to select, via the one or more controller of the second type, which content type the user wishes to be displayed;
   (iii) synchronize the enhanced walkthrough with the game content based on at least one game data element; and
   (iv) automatically overlay the game content with the enhanced walkthrough based on the selected content type.

2. The system of claim 1, wherein said system is further configured to receive content type selection information from the user, wherein said content type selection indicates what content types should be included in said enhanced walkthrough.

3. The system of claim 1, wherein said input selection information indicates prior to recording which controller of said one or more first type controllers should be included during recording walkthrough content.

4. The system of claim 1, wherein said system is further configured to receive a rerecord request from the user.

5. The system of claim 4, wherein said rerecord request causes said system and at least one of the one or more first type or second type controllers to rerecord a portion of the recorded input or data for use in said enhanced walkthrough.

6. The system of claim 1, wherein the system and its memory device storing instructions are further configured to record controller information data.

7. The system of claim 6, wherein said enhanced walkthrough includes said controller information data.

8. The system of claim 1, wherein said recorded events are recorded in a manner selected from the group comprising frequency of said recorded events or sequence of said recorded events.

9. The system of claim 1, wherein said system is further configured to record information selected from the group comprising, location information, position information, time information, date information, game time information, character equipment information.

10. The system of claim 1, wherein when executed by the processor, the instructions cause the system via the processor to automatically record the controller event data and automatically overlay the game content with the recorded controller event data, and wherein the recorded controller event data is selected from the group consisting of a controller button event, analog stick movement, motion sensor movement, mouse movement, key movement, trigger movement, or any combination thereof.

11. The system of claim 10, wherein when executed by the processor, the instructions cause the system via the processor to provide automatic simultaneous playback of the enhanced walkthrough in Picture-in-Picture mode.

12. A method of operating a system comprising: (a) a display device; (b) one or more first type controller associated with identification information corresponding to the first type and optionally associated with a first game platform, the first type controller being selected from the group consisting of a first type game console controller, a first type remote motion detection controller, a first type keyboard, a first type mouse, a first type gaming pedal, and a first type gaming wheel; (c) one or more second type controller associated with identification information corresponding to the second type being different from the first type, and optionally associated with a second game platform, the second game platform optionally being different from the first game platform, the second controller selected from the group consisting of a second type game console controller, a second type remote motion detection controller, a second type keyboard, a second type mouse, a second type gaming pedal, and a second type gaming wheel; and (c) a processor, the method comprising:

(a) automatically generating, via a processor, an enhanced walkthrough by:
   (i) determining, via the processor, that the one or more first type controller is capable of being used to record input from the one or more first type controller based on the identification information;
   (ii) receiving, via the processor, a walkthrough recording request from the one or more first type controller;

(iii) receiving, via the processor, input selection information from the one or more first type controller;
(iv) selecting, via the processor, based on the input selection information, the one or more first type controller to be included during a recording of walkthrough content;
(v) automatically recording, via the processor, the input from the one or more first type controller;
(vi) automatically detecting, via the processor, events from the one or more first type controller;
(vii) providing, via the processor, recorded controller event data by automatically recording the events from the one or more first type controller;
(viii) recording, via the processor, at least one of game video data, player orientation data, player location data, game audio data, external audio data and external video data;
(ix) upon receiving a walkthrough termination request from the one or more first type controller, generating, via the processor, the enhanced walkthrough comprising the recorded controller event data and at least one of the recorded game video data, the recorded player orientation data, the recorded player location data, the recorded game audio data, the recorded external audio data and the recorded external video data;
(b) automatically detecting, via the processor, that the one or more first type controller that was used during the recording of the events is of the first type;
(c) associating, via the processor, the recorded events with an action type or specific button to allow translation to the one or more second type controller and optionally to the second game platform; and
(d) for a user using the one or more controller of the second type:
(1) displaying, via the display device, game content;
(2) enabling the user to select, via the one or more controller of the second type, which content type the user wishes to be displayed;
(3) synchronizing, via the processor, the enhanced walkthrough with the game content based on at least one game data element; and
(4) automatically overlaying, via the processor, the game content with the enhanced walkthrough based on the selected content type.

13. The method of claim 12, further comprising receiving, via the processor, content selection information from the user, wherein said content selection indicates what content should be included in said enhanced walkthrough.

14. The method of claim 12, further comprising receiving, via the processor, input selection information from the user, wherein said input selection indicates which of said one or more first type controller should be included during recording walkthrough content.

15. The method of claim 12, further comprising receiving, via the processor, a rerecord request from the user.

16. The method of claim 15, further comprising rerecording, via the processor, at least one of said one or more first type or second type controller to rerecord a portion of the recorded input or data for use in said enhanced walkthrough.

17. The method of claim 12, further comprising recording, via the processor, controller information data.

18. The method of claim 17, wherein said enhanced walkthrough includes said controller information data.

19. The method of claim 12, wherein said recorded events are recorded in a manner selected from the group comprising frequency of said events or sequence of said events.

20. The method of claim 12, further comprising recording, via the processor, information selected from the group comprising, location information, position information, time information, date information, game time information, character equipment information.

21. A computer program product for providing enhanced walkthroughs, comprising:
a non-transitory computer readable medium storing instructions, which when executed by a processor of a system, cause the processor to operate in conjunction with one or more first and one or more second type controllers and a display device to:
(a) automatically generate an enhanced walkthrough by:
(i) determining that the one or more first type controller is capable of being used to record input from the one or more first type controller based on the identification information;
(ii) receiving a walkthrough recording request from the one or more first type controller;
(iii) receiving input selection information from the one or more first type controller;
(iv) selecting, based on the input selection information, the one or more first type controller to be included during a recording of walkthrough content;
(v) automatically recording the input from the one or more first type controller;
(vi) automatically detecting events from the one or more first type controller;
(vii) providing recorded controller event data by automatically recording the events from the one or more first type controller;
(viii) recording at least one of game video data, player orientation data, player location data, game audio data, external audio data and external video data; and
(vii) upon receiving a walkthrough termination request from the one or more first type controller, generating the enhanced walkthrough comprising the recorded controller event data and at least one of the recorded game video data, the recorded player orientation data, the recorded player location data, the recorded game audio data, the recorded external audio data and the recorded external video data;
(b) automatically detect that the one or more first type controller that was used during the recording of the events is of the first type;
(c) associate the recorded events with an action type or specific button to allow translation to the one or more second type controller and optionally to a second game platform; and
(d) for a user using one or more controller of the second type:
(1) display, via the display device, game content;
(2) enable the user to select, via the one or more controller of the second type, which content type the user wishes to be displayed;
(3) synchronize the enhanced walkthrough with the game content based on at least one game data element; and
(4) automatically overlay the game content with the enhanced walkthrough based on the selected content type.

22. The computer program product of claim 21, wherein when executed by the processor, the instructions cause the system via the processor to receive content selection information from a user, and wherein said content selection indicates what content should be included in said enhanced walkthrough.

23. The computer program product of claim 21, wherein when executed by the processor, the instructions cause the system via the processor to receive input selection information from a user, wherein said input selection indicates which of said one or more first type controllers should be included during recording walkthrough content.

24. The computer program product of claim 21, wherein when executed by the processor, the instructions cause the system via the processor to receive a rerecord request from a user.

25. The computer program product of claim 24, wherein when executed by the processor, the instructions cause the system via the processor to rerecord a portion of said recorded input or data for use in said enhanced walkthrough.

26. The computer program product of claim 21, wherein when executed by the processor, the instructions cause the system via the processor to record controller information data.

27. The computer program product of claim 26, wherein said enhanced walkthrough includes said controller information data.

28. The computer program product of claim 21, wherein when executed by the processor, the instructions cause the system via the processor to record events in a manner selected from the group comprising frequency of said events or sequence of said events.

29. The computer program product of claim 21, wherein when executed by the processor, the instructions cause the system via the processor to record information selected from the group comprising, location information, position information, time information, date information, game time information, character equipment information.

* * * * *